United States Patent
Cady et al.

(10) Patent No.: US 11,005,924 B1
(45) Date of Patent: May 11, 2021

(54) DISPARITY OF QUALITY OF SERVICE (QOS) SETTINGS OF VOLUMES ACROSS A CLUSTER

(71) Applicant: NetApp, Inc., Sunnyvale, CA (US)

(72) Inventors: Tyler Cady, Denver, CO (US); Austino Nicholas Longo, Lafayette, CO (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/837,155

(22) Filed: Apr. 1, 2020

(51) Int. Cl.
*H04L 29/08* (2006.01)
*H04L 1/00* (2006.01)
*H04L 12/911* (2013.01)
*G06N 5/04* (2006.01)

(52) U.S. Cl.
CPC .......... *H04L 67/1012* (2013.01); *G06N 5/04* (2013.01); *H04L 67/1097* (2013.01)

(58) Field of Classification Search
CPC .......... H04L 67/1012; H04L 29/08144; H04L 29/06; H04L 29/08072; H04L 29/08171; H04L 12/5695; H04L 67/1097; G06N 5/04; G06F 11/3447; G06F 11/3452; G06F 11/3442; G06F 11/3485
See application file for complete search history.

(56) References Cited

U.S. PATENT DOCUMENTS

| | | | | |
|---|---|---|---|---|
| 10,866,768 | B2 * | 12/2020 | Breternitz, Jr. | G06F 3/0619 |
| 2009/0287898 | A1 * | 11/2009 | Hara | G06F 3/067 |
| | | | | 711/170 |
| 2014/0223014 | A1 * | 8/2014 | Bairavasundaram | |
| | | | | H04L 67/1097 |
| | | | | 709/226 |
| 2015/0201017 | A1 * | 7/2015 | Hrischuk | H04L 47/70 |
| | | | | 709/226 |
| 2015/0277767 | A1 * | 10/2015 | Hamano | G06F 3/0631 |
| | | | | 711/114 |
| 2017/0053011 | A1 * | 2/2017 | Alatorre | G06F 16/283 |
| 2017/0132085 | A1 * | 5/2017 | Wang | G06F 11/2074 |

* cited by examiner

*Primary Examiner* — Abdullahi E Salad
(74) *Attorney, Agent, or Firm* — Haynes and Boone, LLP

(57) ABSTRACT

A system, method, and machine-readable storage medium for providing a recommendation to a client to modify minimum IOPS settings are provided. In some embodiments, a client may assign a minimum input/output operations per second (IOPS) setting to each volume of a plurality of volumes. The plurality of volumes may reside in a common cluster and include a first number of volumes. A set of volumes of the plurality of volumes may be determined, where each volume of the set of volumes has a relative disparity that satisfies a relative threshold. The set of volumes includes a second number of volumes. A minimum IOPS recommendation may be transmitted to the client to modify (e.g., increase or decrease) the minimum IOPS settings of the set of volumes in response to determining that a ratio of the second number of volumes to the first number of volumes is greater than a performance threshold.

20 Claims, 8 Drawing Sheets

DISPARITY OF QUALITY OF SERVICE (QOS) SETTINGS OF VOLUMES ACROSS A CLUSTER

TECHNICAL FIELD

The present description relates to data storage systems, and more specifically, to a system, method, and machine-readable storage medium for improving quality of service (QoS) settings in a distributed storage system for improved efficiency and user experience.

BACKGROUND

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster.

One way of attempting to provide a better client experience is by allowing clients to set a quality of service (QoS) that guarantees a particular level of performance for volumes. For example, QoS may guarantee a particular level of performance by provisioning minimum, maximum, and/or burst levels of input/output operations per second (IOPS) to volumes. The minimum IOPS setting for a volume may refer to a guaranteed number of IOPS at which the volume will perform, assuming that the cluster in which the volume resides is not over-provisioned. The maximum IOPS value for a volume may refer to the number of IOPS at which the volume will be throttled. The burst IOPS value for a volume may be the number of IOPS that a volume will be able to perform at beyond the maximum IOPS value setting for a short amount of time based upon burst IOPS credits. Burst IOPS credits may be accrued when the volume has been performing at fewer than the maximum IOPS value for an extended amount of time. For example, a volume may accrue burst IOPS credits while the volume performs under the maximum IOPS value (e.g., to a maximum number of credits), and the volume may spend or use burst IOPS credits while the volume performs above the maximum IOPS value.

A client may set the QoS IOPS settings for a volume. QoS settings may be complex and difficult for clients to understand. For example, the client may suboptimally set the QoS settings in such a way that the client experiences poor performance and high latency from the system, without awareness of the QoS settings.

BRIEF DESCRIPTION OF THE DRAWINGS

The present disclosure is best understood from the following detailed description when read with the accompanying figures.

DETAILED DESCRIPTION

Figure 1:
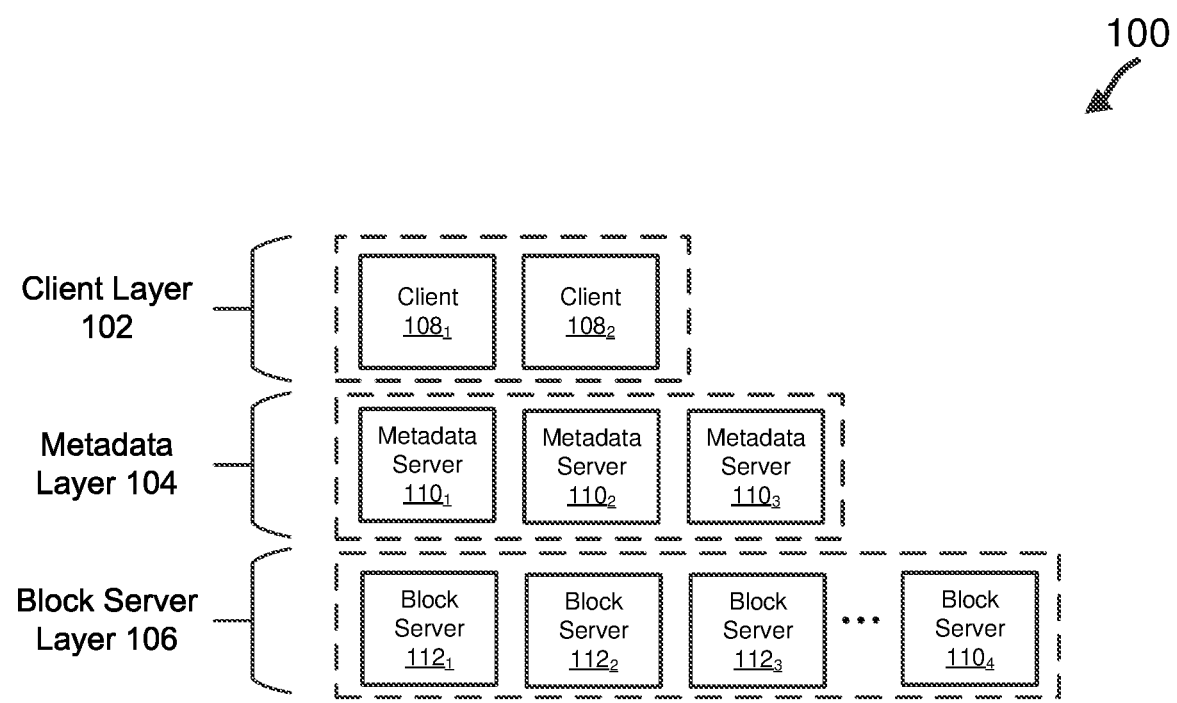
FIG. 1 illustrates a system for a distributed data storage system according to one or more aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

A distributed storage system may include one or more storage nodes, and each storage node may include one or more slice services. Each slice service may include one or more volumes, and a client may store data to multiple volumes, retrieve data from multiple volumes, and/or modify data stored on multiple volumes. The distributed storage system may provide a quality of service (QoS) that guarantees a level of performance by provisioning one or more of QoS metrics. A QoS metric may be, for example, a minimum input/output operations per second (IOPS) assigned to a volume. The minimum IOPS setting for a volume may refer to a guaranteed number of IOPS at which the volume will perform. Other QoS metrics may be, for example, bandwidth and/or latency. One QoS metric or a combination of QoS metrics may be provisioned for a client.

Provisioning IOPS to volumes, however, may be highly dynamic and complex, especially across many volumes or slice services. For example, access to a volume by a client may change frequently. Accordingly, the client may repeatedly need to pay attention and provision IOPS to volumes frequently. Additionally, the level of complexity may be difficult to understand for many clients. Accordingly, clients may consistently misconfigure their QoS settings (e.g., by over-provisioning or under-provisioning their minimum levels of IOPS). Such misconfiguration may lead to suboptimal utilization of the QoS feature and may degrade volume and overall slice service performance.

A slice service balancer may balance volumes on slice services across storage nodes based on, for example, the minimum IOPS settings of the volumes. The slice service balancer may inject latency on I/O operations to keep volumes within their allocated QoS domains. Throttle is the pushback on all volumes on a slice service, and the slice service balancer may enforce QoS by throttling one or more volumes. Throttling a volume acts by restricting the number of IOPS that the volume is allowed to perform, for each sample period (e.g., every 500 milliseconds). If a relatively large difference exists between the minimum IOPS settings across the volumes on a slice service, the load on the volumes may be unbalanced and the user may detect poor performance from the system due to latency.

The present application describes a QoS minimum module for providing a client with a recommendation to modify (e.g., increase or decrease) the minimum IOPS settings of a set of volumes in a common cluster. In some examples, the QoS minimum module may provide a recommended minimum IOPS settings for the set of volumes. In an example, users may opt into allowing the QoS minimum module to automatically modify the minimum IOPS setting of the set of volumes. In another example, the QoS minimum module may provide the recommended minimum IOPS setting to the user, and the user may approve of or reject the modification. If the user approves of the modification, the QoS minimum module may, for each volume of the set of volumes, replace a current minimum IOPS setting of the respective volume with a recommended minimum IOPS setting of the respective volume. If the user rejects the modification, the QoS minimum module does not modify the minimum IOPS settings of the set of volumes.

The set of volumes satisfy criteria of having a relatively large minimum IOPS disparity compared to other volumes in the common cluster. If the number of volumes in the set of volumes is greater than a performance threshold that has been predefined, then the QoS minimum module may determine that performance degradation may occur if the QoS settings of the set of volumes are not modified. In some examples, the QoS minimum module determines the percentage of volumes (with respect to the total of number of volumes in the cluster) that satisfy the criteria of having a relatively large minimum IOPS disparity. If the QoS minimum module determines that the percentage of volumes that satisfy the criteria is greater than the percentage threshold, then the QoS minimum module may trigger a recommendation to the client to modify the minimum IOPS settings of the volumes. The client may decide whether to update the client's current minimum IOPS settings of the volumes. A user may opt into (or out of) providing QoS settings (e.g., minimum IOPS setting) to the QoS minimum module.

As a result, the QoS minimum module may notify the user regarding particular volumes having minimum IOPS settings that may degrade the performance of the distributed data storage system and overall slice service performance. Accordingly, users may have better insight into how the minimum IOPS settings of volumes affect their workload, improving the user's experience and understanding of the system. Additionally, by modifying the minimum IOPS settings of recommended volumes, throttling of volumes may be reduced and accordingly, the computer system and network may run more efficiently and further improve the user's experience.

FIG. 1 illustrates a system 100 for a distributed data storage system according to one or more aspects of the present disclosure. The system 100 includes a client layer 102, a metadata layer 104, and a block server layer 106. The client layer 102 includes clients $108_1$ and $108_2$ in the illustrated example. The metadata layer 104 includes metadata servers $110_1$, $110_2$, and $110_3$ in the illustrated example. The block server layer 106 includes block servers $112_1$, $112_2$, $112_3$, and $112_4$ in the illustrated example. Although the client layer 102 is shown as including two clients 108, the metadata layer 104 is shown as including three metadata servers 110, and the block server layer 106 is shown as including four block servers 112, these examples are not intended to be limiting and in other examples, the client layer 102, the metadata layer 104, and the block server layer 106 may include any number (one or more) of clients 108, metadata servers 110, and block servers 112, respectively.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. When operating across multiple machines, the machines may communicate using a network interface, such as a local area network (LAN) or a wide area network (WAN). In some embodiments, one or more metadata servers 110 may be combined with one or more block servers 112 in a single machine. Entities in the system 100 may be virtualized entities. For example, multiple virtual block servers 112 may be included on a machine. Entities may also be included in a cluster, where computing resources of the cluster are virtualized such that the computing resources appear as a single entity.

The clients 108 include client processes that may exist on one or more physical machines. When the term "client 108" is used in the present disclosure, the action being performed may be performed by a client process. A client process is responsible for storing, retrieving, and/or deleting data in the system 100. A client process may address pieces of data depending on the nature of the storage system and the format of the data stored. For example, the client process may reference data using a client address, which may take different forms. For example, in a storage system that uses file storage, client 108 may reference a particular volume or partition, and a file name. For object storage, the client address may be a unique object name. For block storage, the client address may be a volume or partition, and a block address. The clients 108 may communicate with the metadata layer 104 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

The block servers 112 store data for clients 108. In some embodiments, data may be broken up into one or more storage units. A storage unit may also be referred to as a data block. Data may be segmented into data blocks. Data blocks may be of a fixed size, may be initially a fixed size but compressed, or may be of a variable size. Data blocks may also be segmented based on the contextual content of the block. For example, data of a particular type may have a larger data block size compared to other types of data. Maintaining segmentation of the blocks on a write (and corresponding re-assembly on a read) may occur in the client layer 102 and/or the metadata layer 104. Also, compression may occur in the client layer 102, the metadata layer 104, and/or the block server layer 106.

In some examples, data may be stored in a volume that is referenced by the client 108. A volume may be made up of one or more volume slices. The data associated with the volume includes a list of volume slices for that volume. A volume slice is a list of blocks for a portion of a volume. A block is the raw data for a volume and may be the smallest addressable unit of data.

The block servers 112 may store data on a storage medium. The storage medium may include different medium formats. For example, electromechanical disk storage or a solid state storage drive may be used. Electromechanical disk storage may include spinning disks that use movable read/write heads to read/write to/from different locations of the spinning disks. Inserting the read/write head at various random locations results in slower data access than if data is read from a sequential location. A solid state storage drive uses a solid state memory to store persistent data. Solid state drives may use microchips that store data in non-volatile memory chips and may contain no moving parts. Solid state drives may also perform random access and parallel reads/writes efficiently.

Data from the clients may be stored non-sequentially. In various implementations, non-sequentially storing data in storage is based upon breaking data up into one more data blocks. In addition to storing data non-sequentially, data blocks can be stored to achieve substantially even distribution across the storage system. In various examples, even distribution can be based upon a unique block identifier. For example, the data blocks may be stored in the block server layer 106 based on unique block identifiers.

A block identifier can be an identifier that is determined based on the content of the data block, such as by a hash of the content (e.g., a cryptographic hash function (e.g., Skein algorithm) that generates a hash value identified herein as the "block identifier"). The block identifier is unique to that block of data. For example, blocks with the same content have the same block identifier, but blocks with different content have different block identifiers. The values of possible unique identifiers can have a uniform distribution. The bin assignments may be stored in a distributed key-value store across a cluster (e.g., a cluster 202 in FIG. 2) (e.g., in a so-called "zookeeper" database as just one example). Accordingly, storing data blocks based upon the unique identifier, or a portion of the unique identifier, results in the data being stored substantially evenly across drives in the cluster. Because client data, e.g., a volume associated with the client, is spread evenly across all of the drives in the cluster, every drive in the cluster may be involved in the read and write paths of each volume. This configuration may balance the data and load across all of the drives. Such an arrangement may remove hot spots within the cluster, which can occur when the client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Because clients have their data spread substantially evenly through all the drives in the storage system, a performance of the system can be described in aggregate as a single number, e.g., the sum of performance of all the drives in the storage system.

The block servers 112 maintain a mapping between a block identifier and the location of the data block in a storage medium of block server 112. Data blocks with the same block identifiers are not stored multiple times on a block server 112 when received in multiple client write requests.

The metadata layer 104 may store metadata that maps between the client layer 102 and the block server layer 106. For example, metadata servers 110 may map between the client addressing used by the clients 108 (e.g., file names, object names, block numbers, etc.) and block layer addressing (e.g., block identifiers) used in the block server layer 106. The clients 108 may perform access based on client addresses, and block servers 112 may store data based on unique block identifiers for the data.

Figure 2:
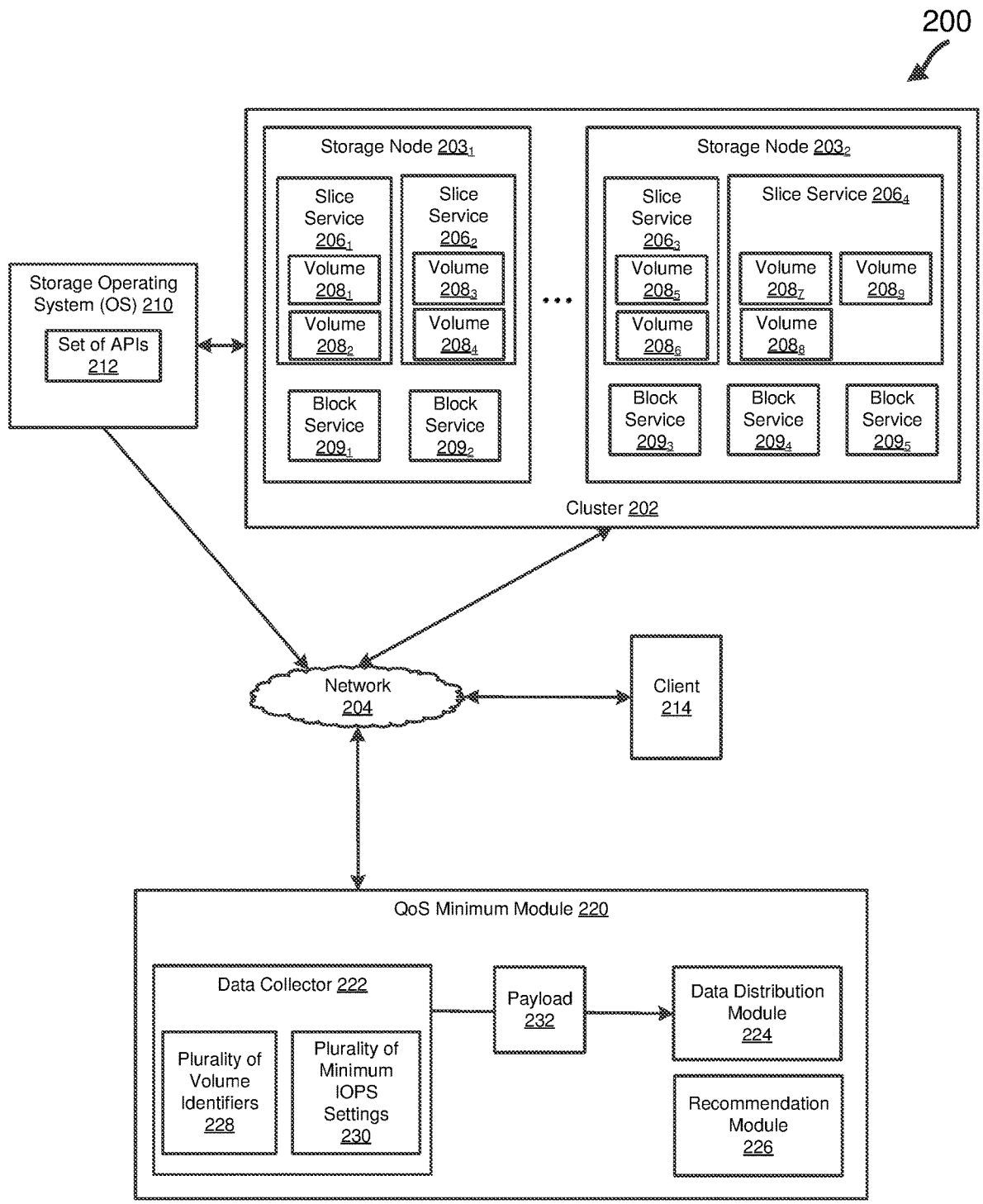
FIG. 2 illustrates a system including a cluster of storage nodes coupled to a quality of service (QoS) minimum module according to one or more aspects of the present disclosure.

FIG. 2 illustrates a system 200 including a cluster 202 of storage nodes 203 coupled to a quality of service (QoS) minimum module 220 according to one or more aspects of the present disclosure. The cluster 202 includes a plurality of storage nodes 203, and each storage node 203 may include one or more slice services 206 as well as one or more block services 209. One or more volumes 208 may be maintained by a slice service 206.

A client 214 may correspond to the client 108, the slice services 206 may correspond to the metadata server 110, and the block service 209 may correspond to the block server 112 illustrated in FIG. 1. The client 214 may store data to, retrieve data from, and/or modify data stored at the cluster 202. Each client 214 may be associated with a volume. In some examples, only one client 214 accesses data in a volume. In some examples, multiple clients 214 may access data in a single volume. The slice services and/or the client 214 may break data into data blocks, such as discussed above with respect to FIG. 1. Block services 209 and slice services 206 may maintain mappings between the client's address the eventual physical location of the data block in respective storage media of one or more storage nodes 106. A volume includes these unique and uniformly random identifiers, and so a volume's data is also evenly distributed throughout the cluster.

The slice services 206 may store metadata that maps between clients 214 and block services 209. For example, slice services 206 may map between the client addressing used by clients 214 (e.g., file names, object names, block numbers, etc. such as LBAs) and block layer addressing (e.g., block identifiers) used in block services 209. Further, block services 209 may map between the block layer addressing (e.g., block identifiers) and the physical location of the data block on one or more storage devices. The blocks may be organized within bins maintained by the block services 209 for storage on physical storage devices (e.g., SSDs). A bin may be derived from the block ID for storage of a corresponding data block by extracting a predefined number of bits from the block identifiers introduced above.

In some embodiments, the bin may be divided into buckets or "sublists" by extending the predefined number of bits extracted from the block identifier. A bin identifier may be used to identify a bin within the system. The bin identifier may also be used to identify a particular block service 209 (e.g., block service $209_1$-$209_5$ in the example of FIG. 2) and associated storage device (e.g., SSD). A sublist identifier may identify a sublist with the bin, which may be used to facilitate network transfer (or syncing) of data among block services in the event of a failure or crash of a storage node. Accordingly, a client can access data using a client address, which is eventually translated into the corresponding unique identifiers that reference the client's data at the storage node 203.

For each volume hosted by a slice service 206, a list of block identifiers may be stored with one block identifier for each logical block on the volume. Each volume may be replicated between one or more slice services 206 and/or storage nodes 203, and the slice services for each volume may be synchronized between each of the slice services hosting that volume. Accordingly, failover protection is provided in case a slice service 206 fails, such that access to each volume may continue during the failure condition.

The above structure allows storing of data evenly across the cluster of storage devices (e.g., SSDs), which allows for performance metrics to manage load in the system 100, 200. For example, if the system 100, 200 is under a load, clients can be throttled or locked out of a volume. When a client is locked out of a volume, a slice service 206 or volume 208 may close the command window or reduce to zero the amount of read or write data that is being processed at a time for the client 214. The slice service 206 or the volume 208 can queue access requests for the client 214, such that I/O requests from the client 214 can be processed after the client's access to the volume resumes after the lock out period.

Although parts of the system 200 are shown as being logically separate, entities may be combined in different ways. For example, functions discussed in the present disclosure may be combined into a single process or single machine (e.g., a computing device) and multiple functions or all functions may exist on one machine or across multiple machines. Additionally, when operating across multiple machines, the machines may communicate using a network interface, such as a local area network (LAN) or a wide area network (WAN). In some implementations, slice services 206 may be combined with one or more block services 209 in a single machine. Additionally or alternatively, entities in system 200 may be virtualized entities. Entities may also be included in the cluster 202, where computing resources of the cluster are virtualized such that the computing resources appear as a single entity.

The QoS minimum module 220 may govern or guarantee levels of performance (e.g., IOPS, bandwidth, etc.) for volumes residing in the cluster 202. In the example illustrated in FIG. 2, the cluster 202 may include storage node $203_1$ including a slice service $206_1$ and a slice service $206_2$, with the slice service $206_1$ including volumes $208_1$ and $208_2$ and the slice service $206_2$ including volumes $208_3$ and $208_4$. The cluster 202 may also include storage node $203_2$ including a slice service $206_3$ and a slice service $206_4$, with the slice service $206_3$ including volumes $208_5$ and $208_6$ and the slice service $206_4$ including volumes $208_7$, $208_8$, and $208_9$. These are merely examples, and it should be understood that a storage node 203 may include any number of slice services (e.g., one or more slice services), and a slice service may include any number of volumes (e.g., one or more volumes).

A user (e.g., an administrator and/or a client) may set the client QoS settings of a volume for a client. Client QoS settings are variables that can be set that define the desired QoS bounds for a client and accordingly can be used to affect how a client uses the storage system. Performance and capacity can be provisioned for volumes independently of each other. A QoS metric may be, for example, IOPS, which is a unit of measure of input/output operations per second. The client's QoS IOPS settings for the volume $208_1$ may include, for example, a minimum IOPS setting, a maximum IOPS setting, and/or a burst IOPS setting for the volume. A minimum IOPS setting may also be referred to as a minimum IOPS value. The minimum IOPS setting for a volume may refer to a guaranteed number of IOPS at which the volume will perform, assuming that the cluster 202 in which the volume resides is not over-provisioned. The maximum IOPS configuration for each node may vary from node type to node type. An example maximum configuration for a node type may be 75,000 IOPS. In an example, if the sum of the minimum IOPS settings of the volumes across the node exceeds 75,000 (e.g., there are 3 volumes with 30,000 minimum IOPS settings), then the cluster may be said to be over-provisioned with respect to IOPS.

The maximum IOPS value for a volume may refer to the number of IOPS at which the volume will be throttled. The burst IOPS value for a volume may be the number of IOPS that a volume will be able to perform at beyond the maximum IOPS value setting for a short amount of time based upon burst IOPS credits. Burst IOPS credits may be accrued when the volume has been performing at fewer than the maximum IOPS value for an extended amount of time. For example, a volume may accrue one burst IOPS credit for each second the volume performs under the maximum IOPS value, and the volume may spend or use one burst IOPS credit for each second the volume spends performing above the maximum IOPS value. A volume may accrue a maximum number of burst IOPS credits (e.g., sixty burst IOPS credits). Although the application may describe the QoS metric as being in terms of IOPS, it should be understood that embodiments of the disclosure may also apply to other QoS metrics (e.g., bandwidth, latency, etc.).

Each slice service 206 may have a respective storage operating system (OS) 210. Moreover, one of the storage OS 210 may operate as a cluster manager to other slice services 206 within the cluster. Should that slice service 206 with the storage OS 210 operating as the cluster manager fail, another storage OS 210 may assume that role in its place. The storage OS 210 may track QoS settings (e.g., minimum IOPS setting) per volume, per client.

A client may access multiple volumes, and multiple clients may access the same volume. The same volume may be assigned the same and/or different minimum IOPS settings by different clients. Additionally or alternatively, different volumes may be assigned the same and/or different minimum IOPS settings by the same client. The storage OS 210 may balance volumes 208 on the slice services 206 across the storage nodes 203 based on their guaranteed QoS settings. For example, the storage OS 210 may inject latency on I/O operations to keep volumes within their allocated QoS domains. Throttle is the pushback on all volumes on a slice service, and the storage OS 210 enforces QoS by throttling one or more volumes. In other words, throttling is the mechanism by which the QoS is enforced. Throttling a volume acts by restricting the number of IOPS that the volume is allowed to perform, for each sample period (e.g., every 500 milliseconds).

In some examples, the storage OS 210 acts as a slice service balancer that balances volumes on slice services based on the minimum IOPS settings of the volumes. If a relatively large difference exists between the minimum IOPS settings across the volumes on a slice service, the load on the volumes may be unbalanced and the user may detect poor performance from the system due to latency. For example, if the client 214 accesses one hundred volumes and ninety-eight of those volumes are set at a minimum IOPS setting of 50 IOPs (e.g., by default) and two of those volumes are set at a minimum IOPS setting of 2,000 IOPS, the former ninety-eight volumes may be grouped together on the slice service $206_1$ or the storage node $203_1$ and the other two latter volumes may be grouped together on the slice service $206_3$ or the storage node $203_2$. The client 214 may set the latter two volumes to the higher minimum IOPS setting of 2,000 IOPS for various reasons. For example, the client 214 may be inexperienced in assigning QoS settings to volumes, may expect a large workload without taking into consideration the QoS settings for the other ninety-eight volumes, etc.

In an example, the client 214 may assign the volumes $208_1$ and $208_2$ residing on the service slice $206_1$ the lower minimum IOPS setting of 50 IOPS and may assign the volumes $208_7$ and $208_8$ residing on the service slice $206_4$ the higher minimum IOPS setting of 2,000 IOPS. Workloads across applications may change in ways that are unpredictable by a client. If the workload on the volume $208_1$ has a significant increase in I/O demand, then a large proportion of the volumes on the service slice $206_1$ may be negatively impacted. For example, if a client disproportionately allocates the minimum IOPS settings of a plurality of volumes accessed by the client, load balancing issues may arise if the allocation does not accurately reflect the desired performance. If the storage OS 210 detects that the volume $208_1$ may be unable to satisfy its minimum IOPS setting (e.g., due to the increase in I/O demand), the storage OS 210 may start to throttle the slice service $206_1$ on which the volume $208_1$ resides, resulting in degradation of performance for the entire slice service. If the storage OS 210 throttles a slice service 206, the storage OS 210 may throttle each of the volumes residing on that slice service 206. Such latency injection may enable predictable and consistent performance across all volumes and may eliminate the "noisy problem," which may occur when a volume's I/O spikes and "takes" I/O from other volumes that reside on the same nodes.

A latency service load may refer to a perceived latency for volume I/O on a particular slice service 206, where the latency service load is a number between 0 and 100, inclusive (as just one example). The storage OS 210 may increase the latency service load (e.g., by one) when volumes residing on the slice service 206 are observed to be unable to reach their minimum IOPS value due to latency; otherwise the storage OS 210 decreases the latency service load (e.g., by one).

The storage OS 210 may be included in one or more of the storage nodes 203 (or on another component in FIG. 1 or FIG. 2) or may be separate from the storage nodes 203 and communicate with the storage nodes 203 through a network 204. Although in the example illustrated in FIG. 2, the QoS minimum module 220 is separate from the storage OS 210 and the cluster 202, in other examples one or more components of the QoS minimum module 220 may reside as part of the storage OS 210 and/or as part of the cluster 202.

The QoS minimum module 220 includes a data collector 222, a data distribution module 224, and a recommendation module 232. The storage OS 210 may expose a set of application programming interface (APIs) 212 that when invoked provide information about one or more storage nodes 203 included in the cluster 202. The data collector 222 may invoke one or more APIs of the set of APIs 212 to retrieve QoS information such as the client 214's QoS settings for a particular volume and the volume identifier of the particular volume. A volume identifier may be an identifier that identifies a volume. In response to the data collector 222 invoking one or more APIs of the set of APIs 212, the storage OS 210 may transmit a payload 232 including a plurality of volume identifiers 228 and a plurality of minimum IOPS settings 230 to the data collector 222. The client 214 may access a plurality of volumes identified by the plurality of volume identifiers 228 and may assign the plurality of minimum IOPS settings 230 to the plurality of volumes.

In some examples, for each volume of the plurality of volumes for the client 214, the data collector 222 may receive a volume identifier that identifies the respective volume and a QoS minimum setting assigned to the respective volume. The payload 232 may include JavaScript Object Notation (JSON) data (as an example) storing the applicable information (e.g., the plurality of volume identifier 228 and the plurality of minimum IOPS settings 230), and the data collector 222 may receive the raw JSON data. JSON data may be written in the form of name-value pairs, where a name-value pair includes a field name and a value of the field. The data collector 222 may parse and process the JSON fields and ensure data integrity (e.g., perform datatype checks, etc.) before transmitting the payload 232 including the plurality of volume identifiers 228 and the plurality of minimum IOPS settings 230 to the data distribution module 224.

The data distribution module 224 may receive the payload 232 and determine a lower bound and an upper bound distribution of the plurality of minimum IOPS settings 230 of the plurality of volumes across the cluster 202. The lower bound indicates a first distribution of minimum IOPS settings or values assigned to the plurality of volumes, and the upper bound indicates a second distribution of minimum IOPS values assigned to the plurality of volumes. For example, the lower bound may be the twenty-fifth percentile and the upper bound may be the seventy-fifth percentile for the plurality of minimum IOPS settings 230. The lower bound and/or the upper bound may provide a general picture of how the minimum IOPS settings are distributed across the plurality of volumes in the cluster 202.

Figure 3:
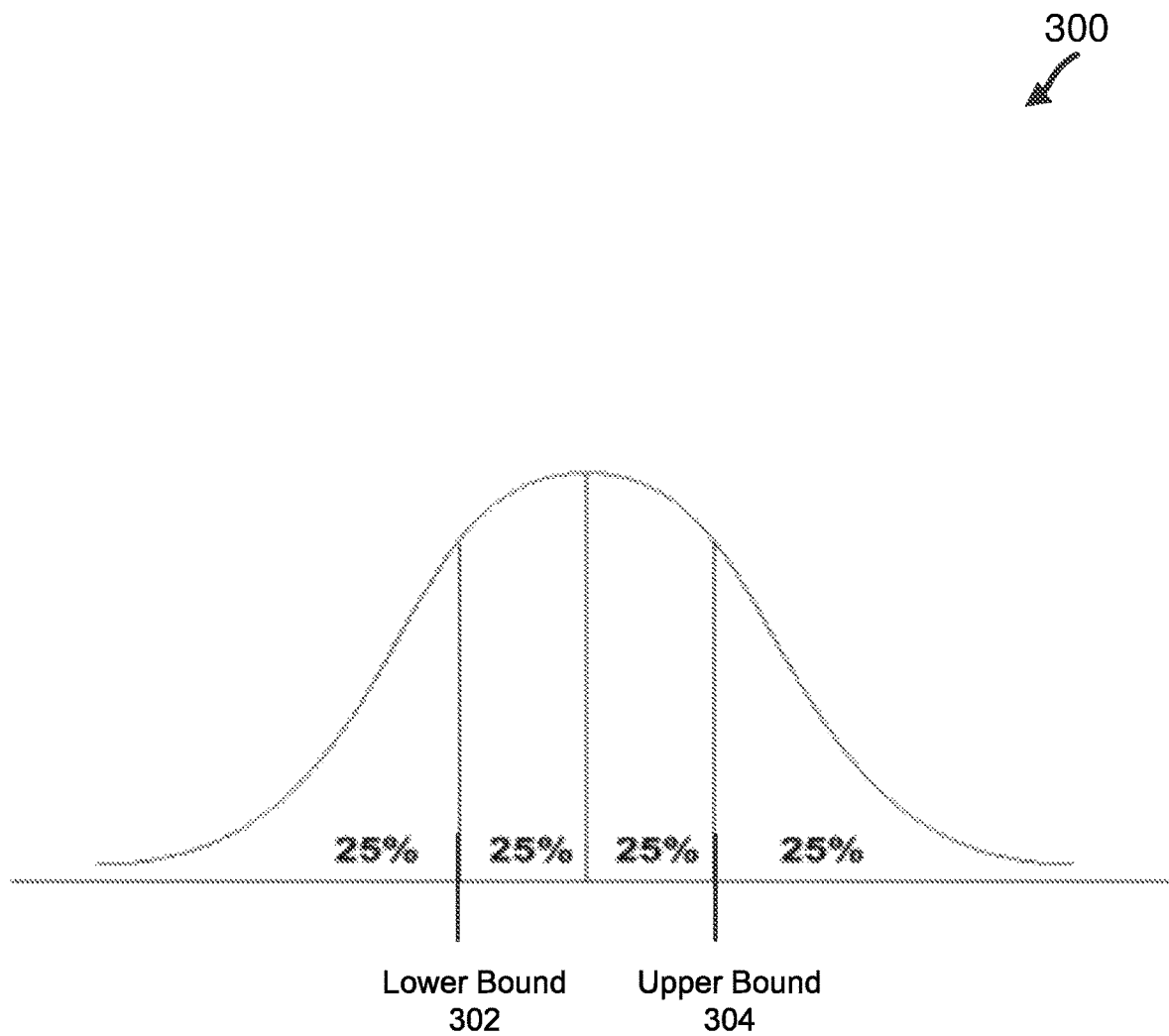
FIG. 3 illustrates a graph illustrating a distribution of data in accordance with four quartiles according to one or more aspects of the present disclosure.

FIG. 3 illustrates a graph 300 illustrating a distribution of data in accordance with four quartiles according to one or more aspects of the present disclosure. FIGS. 2 and 3 will be discussed relative to each other to better understand some concepts of the present disclosure. In the example illustrated in FIG. 3, the graph 300 illustrates a spread of values based on four quartiles. Additionally, a lower bound 302 is defined as being at the twenty-fifth percentile, and an upper bound 304 is defined as being at the seventy-fifth percentile. Using the minimum IOPS settings as an example of the data, the lower quartile of the plurality of minimum IOPS settings 230 may fall at or below the lower bound 302, and the upper quartile of the plurality of minimum IOPS settings 230 may fall at or above the upper bound 304. In an example, the set of minimum IOPS settings for eleven volumes includes the following: {50, 70, 120, 140, 150, 220, 250, 300, 360, 1000, 1150}. If the lower bound 302 is defined as being at the twenty-fifth percentile, then the lower bound 302 is 120 minimum IOPS, where 25 percent of the set of minimum IOPS settings falls at or below the 120 minimum IOPS setting. If the upper bound 304 is defined as being at the seventy-fifth percentile, then the upper bound 304 is 360 minimum IOPS, where 25 percent of the set of minimum IOPS settings falls at or above the 360 minimum IOPS setting. It may be desirable for the minimum IOPS settings of the plurality of volumes to fall within the lower bound 302 and the upper bound 304 such that their minimum IOPS settings are relatively close to each other.

Although the data distribution module 224 is described as determining the lower bound 302 and the upper bound 304 based on quartiles (e.g., twenty-fifth percentile and seventy-fifth percentile, respectively), this is not intended to be limiting and in other examples, the data distribution module 224 may set the lower bound 302 and/or the upper bound 304 in accordance with a different distribution of data values (e.g., minimum IOPS settings). In some examples, the data distribution module 224 may set the lower bound 302 between a range of about the twentieth percentile and about the thirty-third percentile and may set the upper bound 304 between a range of about the seventieth percentile and about the eightieth percentile. For example, the data distribution module 224 may set the lower bound 302 at the thirtieth percentile and the upper bound 304 at the seventieth percentile. Other bounds are contemplated as well.

Figure 4:
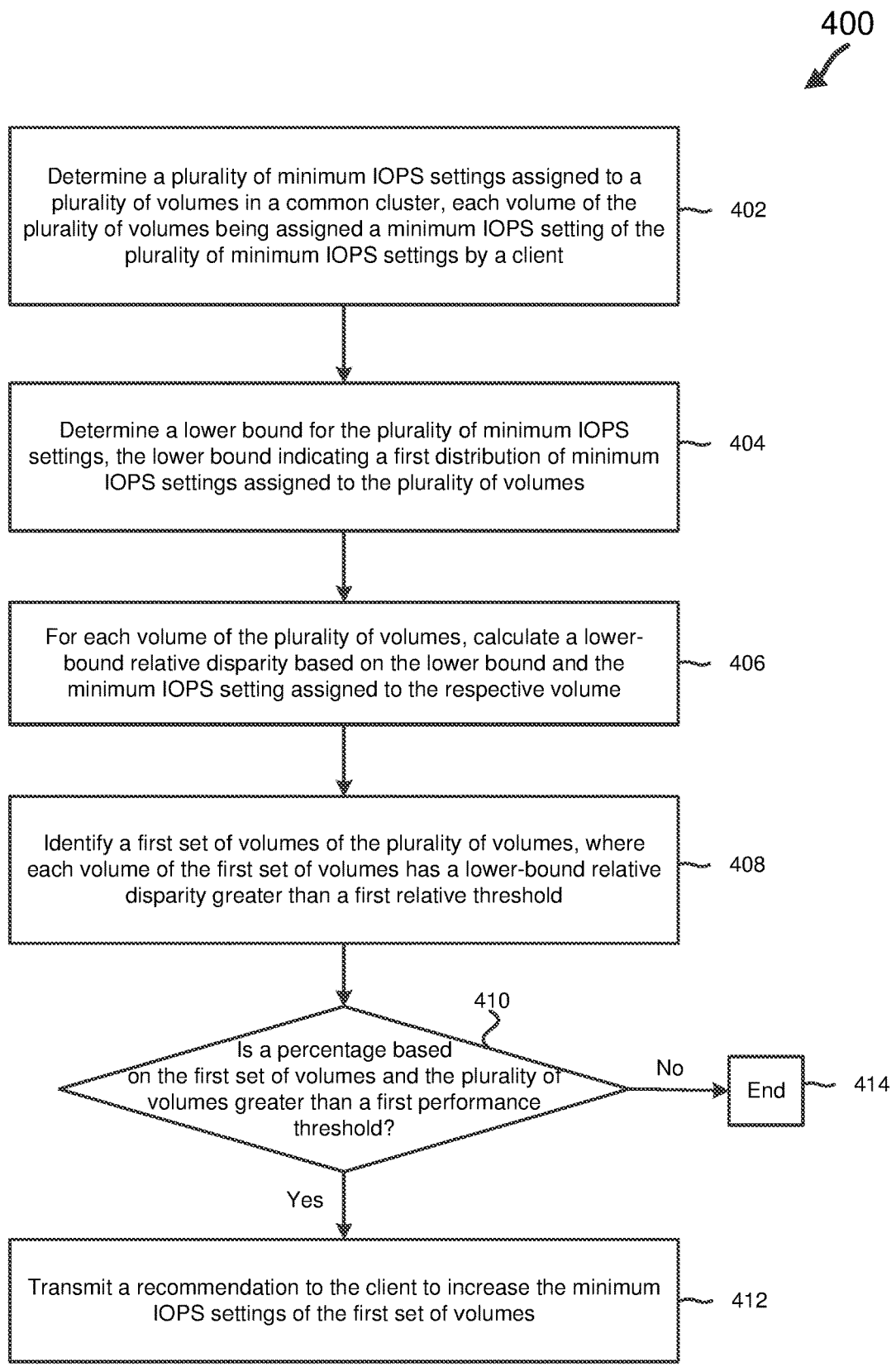
FIG. 4 illustrates a flow diagram of a method of providing a minimum input/output operations per second (IOPS) setting recommendation to increase the minimum IOPS settings based on a lower bound according to one or more aspects of the present disclosure.
Figure 5:
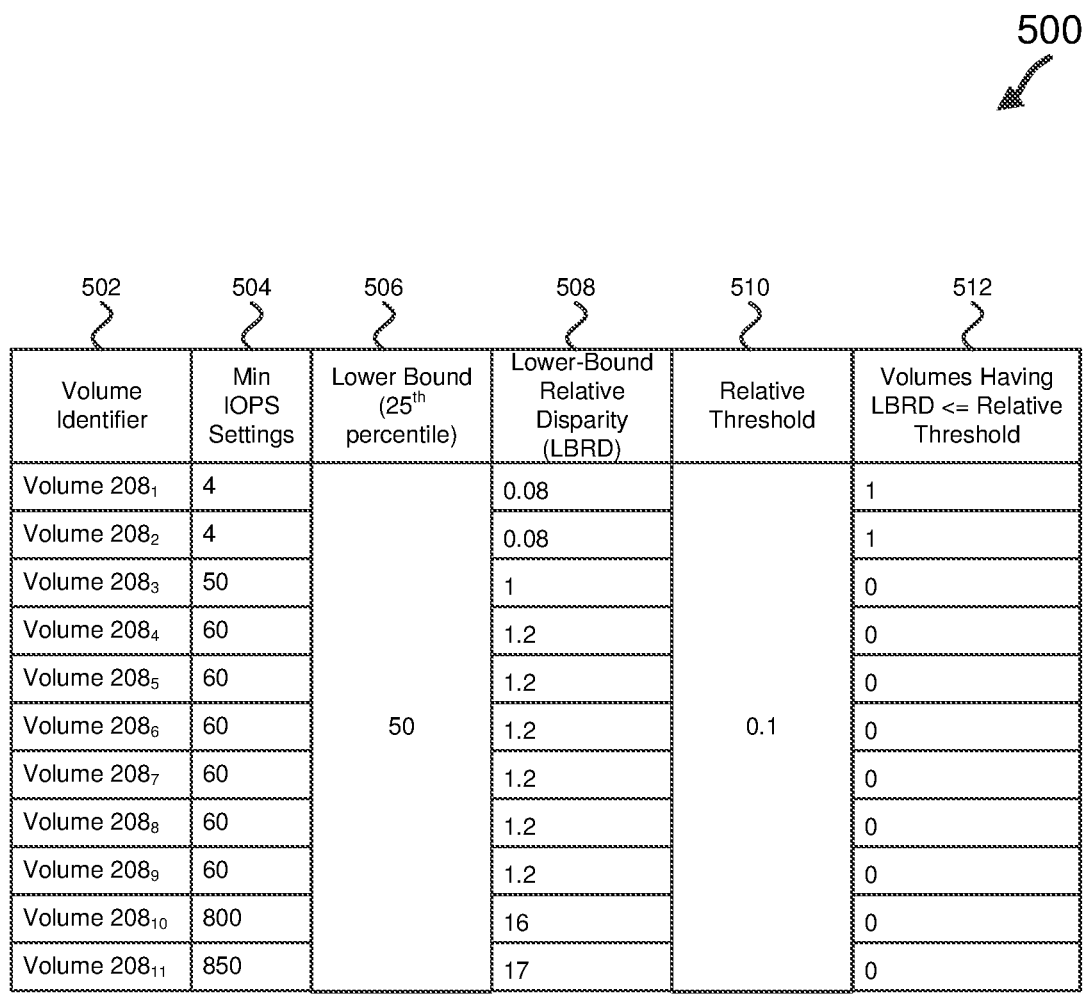
FIG. 5 illustrates a table storing QoS information in relation to the lower bound according to one or more aspects of the present disclosure.
Figure 6:
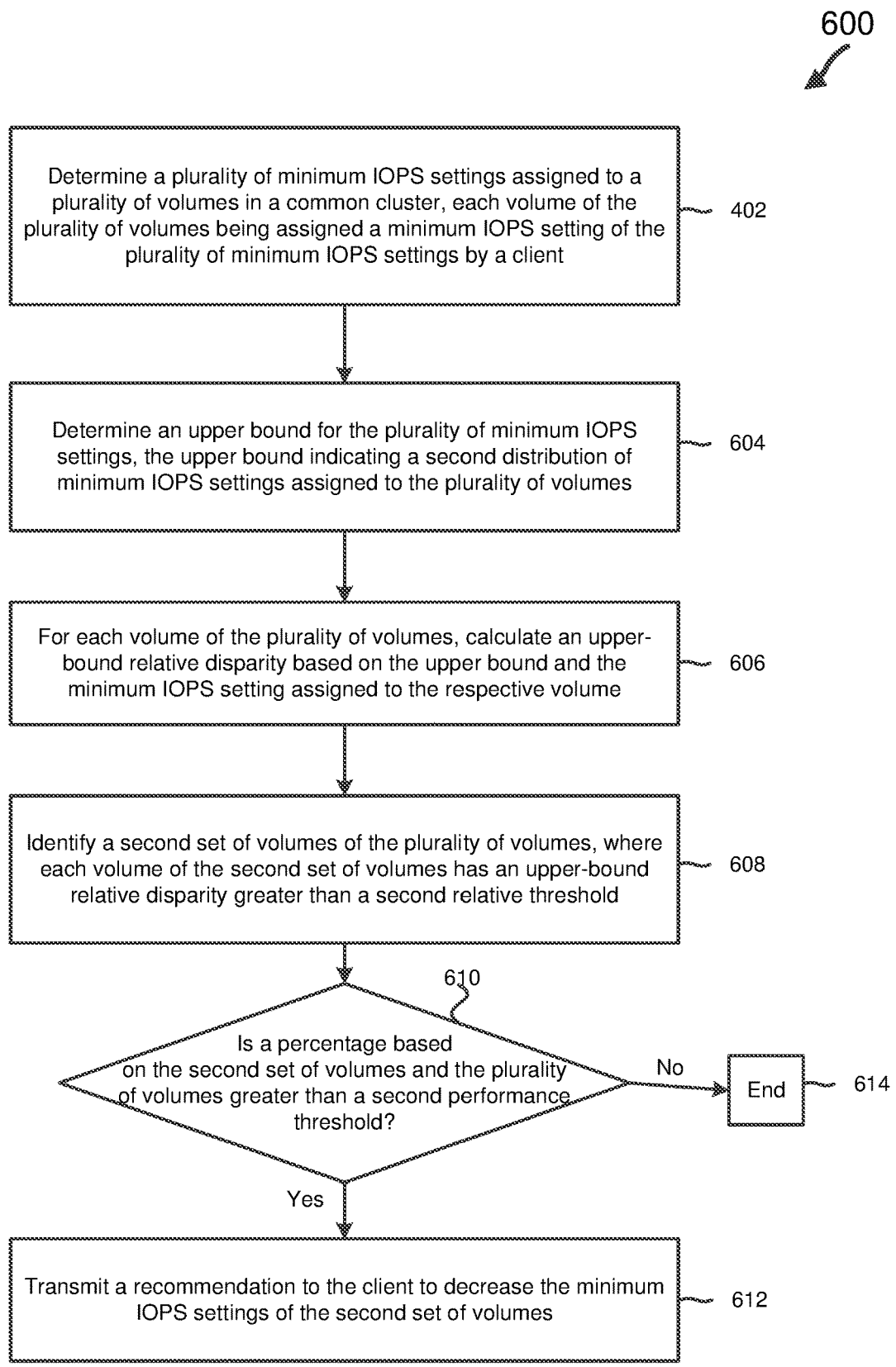
FIG. 6 illustrates a flow diagram of a method of providing a minimum IOPS setting recommendation to decrease the minimum IOPS settings based on an upper bound according to one or more aspects of the present disclosure.
Figure 7:
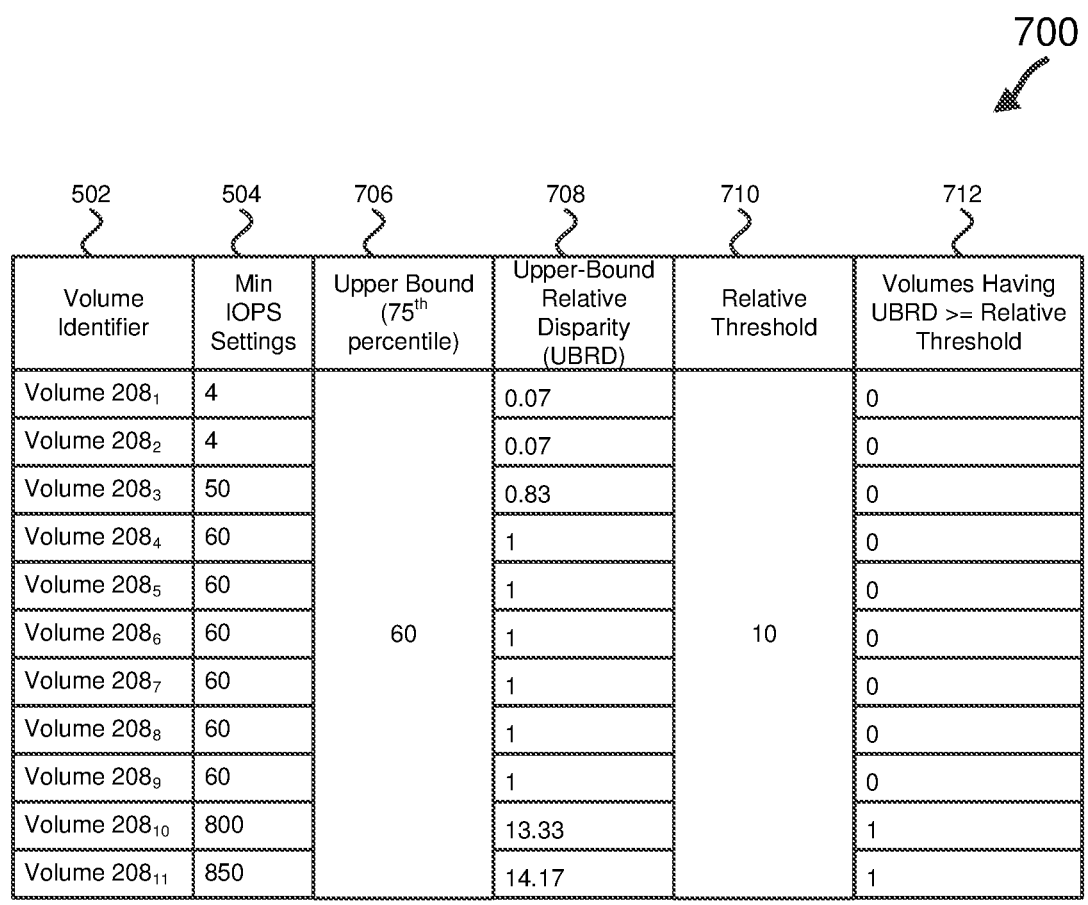
FIG. 7 illustrates a table storing QoS information in relation to the upper bound according to one or more aspects of the present disclosure.

In an example, the data distribution module 224 may determine a lower-bound relative disparity for each volume of the set of volumes used by a client by dividing the respective minimum IOPS setting of each volume by the lower bound 302 corresponding to the set of volumes. The data distribution module 224 may determine that a given volume has a relatively large minimum IOPS setting disparity if the lower-bound relative disparity of the given volume satisfies a relative threshold (e.g., the lower-bound relative disparity of the given volume not greater than 0.1). FIGS. 4 and 5 provide more details on identifying volumes that have minimum IOPS setting disparities that are relatively large. In another example, the data distribution module 224 may determine an upper-bound relative disparity for each volume of the set of volumes used by a client by dividing the respective minimum IOPS setting of each volume by the upper bound 304 corresponding to the set of volumes. The data distribution module 224 may determine that a given volume has a relatively large minimum IOPS setting disparity if the upper-bound relative disparity of the given volume satisfies a relative threshold (e.g., the upper-bound relative disparity of the given volume not less than 10). FIGS. 6 and 7 provide more details on identifying volumes that have minimum IOPS setting disparities that are relatively large.

The data distribution module 224 may determine the number of volumes that have minimum IOPS setting disparities that are relatively large and then determine the percentage of volumes (with respect to the total of number of volumes in the cluster) that meet the criteria of having a relatively large minimum IOPS disparity. If the data distribution module 224 determines that the percentage of volumes that meet the threshold criteria is greater than a percentage threshold that has been established, then performance degradation may occur. In this example, the data distribution module 224 may trigger a recommendation to the client to modify the minimum IOPS settings of the volumes that meet the criteria of having a relatively large minimum IOPS disparity.

As will be discussed in further detail below in FIGS. 4-8, the data distribution module 224 may identify a first set of volumes having minimum IOPS setting disparities that are relatively large based on the lower bound and the plurality of volumes accessed by the client 214 in the cluster 202. If the number of volumes in the first set of volumes is greater than a first percentage threshold, then the recommendation module 226 may transmit a recommendation to the client 214 to modify (e.g., increase) the minimum IOPS settings of the first set of volumes. In some aspects, the recommendation module 226 may provide a recommended minimum IOPS settings for the first set of volumes. The recommendation module 226 may modify the minimum IOPS setting of the first set of volumes to be P minimum IOPS setting, where P is a number greater than 0. In an example, P is the lower bound of the set of volumes. In another example, the recommendation module 226 determines a product of the relative threshold and the lower bound 302, where P is the product. The storage OS 210 may expose an update API (e.g., in the set of APIs 212 in FIG. 2) that when invoked by an entity causes one or more QoS settings to be updated (e.g., set the first set of volumes to P minimum IOPS setting). For example, the recommendation module 226 may invoke the update API and cause the minimum IOPS setting of the first set of volumes to be updated based on the applicable recommended minimum IOPS settings. The storage OS 210 (or another entity) may perform the one or more QoS setting updates.

Additionally or alternatively, the data distribution module 224 may identify a second set of volumes having minimum IOPS setting disparities that are relatively large based on the upper bound and the plurality of volumes accessed by the client 214 in the cluster 202. If the number of volumes in the second set of volumes is greater than a second percentage threshold, then the recommendation module 226 may transmit a recommendation to the client 214 to modify (e.g., decrease) the minimum IOPS settings of the second set of volumes. In some aspects, the recommendation module 226 may provide a recommended minimum IOPS settings for the second set of volumes. The recommendation module 226 may modify the minimum IOPS setting of the second set of volumes to be Q minimum IOPS setting, where Q is a number greater than 0. In an example, Q is the upper bound of the set of volumes. In another example, the recommendation module 226 determines a product of the relative threshold and the upper bound 304, where Q is the product. The storage OS 210 may expose an update API (e.g., in the set of APIs 212 in FIG. 2) that when invoked by an entity causes one or more QoS settings to be updated (e.g., set the second set of volumes to Q minimum IOPS setting). For example, the recommendation module 226 may invoke the update API and cause the minimum IOPS setting of the second set of volumes to be updated based on the applicable recommended minimum IOPS settings. The storage OS 210 (or another entity) may perform the one or more QoS setting updates.

The second performance threshold may be the same as or different from the first performance threshold. In some examples, the second performance threshold is greater than the first performance threshold. In some examples, the second performance threshold is less than the first performance threshold.

FIG. 4 illustrates a flow diagram of a method 400 of providing a minimum IOPS setting recommendation to increase the minimum IOPS settings based on a lower bound according to one or more aspects of the present disclosure. Blocks of the method 400 can be executed by a computing device (e.g., a processor, processing circuit, and/or other suitable component, such as of a storage node 203). For example, the QoS minimum module 220 may utilize one or more components, such as the data collector 222, the data distribution module 224, and/or the recommendation module 226, to execute the blocks of method 400. As illustrated, the method 400 includes a number of enumerated blocks, but embodiments of the method 400 may include additional blocks before, after, and in between the enumerated blocks. In some embodiments, one or more of the enumerated blocks may be omitted or performed in a different order.

FIG. 4 will be discussed relative to FIG. 5 (and vice versa) to better understand concepts related to determining whether to provide a recommendation to a client to increase the minimum IOPS setting of a set of volumes. FIG. 5 is a table 500 storing QoS information in relation to the lower bound according to one or more aspects of the present disclosure.

In FIG. 4, at block 402, the method 400 includes determining a plurality of minimum IOPS settings assigned to a plurality of volumes in a common cluster, each volume of the plurality of volumes being assigned a minimum IOPS setting of the plurality of minimum IOPS settings by a client. In an example, the data distribution module 224 may determine the plurality of minimum IOPS settings assigned to the plurality of volumes in the common cluster. The data distribution module 224 may execute block 402, for example, periodically (e.g., once a week) or upon request by a client. For each volume used by the client, the client may set the minimum IOPS setting of the respective volume. At a later point in time, the client may change the minimum IOPS setting of the volume.

For example, in FIG. 5, the table 500 includes a first column "Volume Identifier" 502 storing an identifier of a volume of the plurality of volumes and a second column "Min IOPS Settings" 504 storing a minimum IOPS setting of the volume identified in the same entry. For example, the volume $208_1$ has a minimum IOPS setting of 4 in a first entry, the volume $208_2$ has a minimum IOPS setting of 4 in a second entry, the volume $208_3$ has a minimum IOPS setting of 50 in a third entry, the volume $208_4$ has a minimum IOPS setting of 60 in a fourth entry, and so on.

Referring back to FIG. 4, at block 404, the method 400 includes determining a lower bound for the plurality of minimum IOPS settings, the lower bound indicating a first distribution of minimum IOPS settings assigned to the plurality of volumes. In an example, the data distribution module 224 may determine the lower bound for the plurality of minimum IOPS settings. The lower bound may provide a snapshot of the first distribution of minimum IOPS settings across the common cluster. For example, in FIG. 5, the table 500 includes a third column "Lower Bound ($25^{th}$ percentile)" 506 storing the lower bound of 50 for the plurality of volumes. In particular, 50 minimum IOPS indicates a twenty-fifth percentile distribution of the plurality of minimum IOPS settings assigned to the plurality of volumes, where the lower 25 percent of the plurality of volumes (e.g., eleven volumes) falls at or below the lower bound of 50 minimum IOPS.

Referring back to FIG. 4, at block 406, the method 400 includes for each volume of the plurality of volumes, calculating a lower-bound relative disparity based on the lower bound and the minimum IOPS setting assigned to the respective volume. In an example, the data distribution module 224 may calculate a lower-bound relative disparity for each volume of the plurality of volumes. A relative measure of disparity expresses the difference between minimum IOPS settings in terms of a chosen reference point (e.g., the lower bound). The lower-bound relative disparity may provide a measure of distance between the minimum IOPS setting assigned to a volume and the lower bound. In some examples, the lower-bound relative disparity may be a relative disparity percentage value. A percentage difference expresses the difference from the reference point as a percentage of the reference point. The data distribution module 224 may calculate a percentage difference based on the minimum IOPS setting of a volume and the lower bound.

For example, in FIG. 5, the table 500 includes a fourth column "Lower-Bound Relative Disparity (LBRD)" 508 storing the lower-bound relative disparity for each volume of the plurality of volumes. The data distribution module 224 may calculate the lower-bound relative disparity for a volume by dividing the minimum IOPS setting for the volume by the lower bound. For example, to determine the lower-bound relative disparity for the volumes $208_1$ and $208_2$, the data distribution module 224 may divide 4 by 50 to obtain 0.08; to determine the lower-bound relative disparity for the volume $208_3$, the data distribution module 224 may divide 50 by 50 to obtain 1; to determine the lower-bound relative disparity for the volumes $208_4$-$208_9$, the data distribution module 224 may divide 60 by 50 to obtain 1.2 for each; to determine the lower-bound relative disparity for the volume $208_{10}$, the data distribution module 224 may divide 800 by 50 to obtain 16; and to determine the lower-bound relative disparity for the volume $208_{11}$, the data distribution module 224 may divide 850 by 50 to obtain 17.

The lower-bound relative disparity may provide a relative difference of minimum IOPS settings between any volume and the rest of the plurality of volumes. Smaller differences between the lower-bound relative disparities of volumes may indicate that the volumes have been assigned minimum IOPS settings that are relatively close to each other. For example, the volumes $208_3$-$208_9$ have a lower-bound relative disparity amongst each other between 1 and 1.2, with a difference of 0.2 between them. Such a small difference may indicate that these volumes have been assigned minimum IOPS settings that are relatively close to each other. Larger differences between the lower-bound relative disparities of volumes may indicate that the volumes have been assigned minimum IOPS settings that are not relatively close (or are far from) to each other. For example, the volumes $208_1$ and $208_2$ have a lower-bound relative disparity of 0.8 and the volume $208_{10}$ has a lower-bound relative disparity of 16, with a difference of 15.2 between them. Such a large difference may indicate that these volumes have been assigned minimum IOPS settings that are not relatively close (or are far from) to each other.

Additionally, the further a volume's lower-bound relative disparity value is from 1 may indicate how far the volume's minimum IOPS setting is from the lower bound relative to other volumes of the plurality of volumes. For example, each of the volumes $208_4$-$208_9$ has a lower-bound relative disparity of 1.2, and the volume $208_{10}$ has a lower-bound relative disparity of 16. The lower-bound relative disparity of the volumes $208_4$-$208_9$ is closer to 1 than the lower-bound relative disparity of the volume $208_{10}$. Accordingly, the minimum IOPS settings of the volumes $208_4$-$208_9$ is closer to the lower bound than the volume $208_{10}$.

Referring back to FIG. 4, at block 408, the method 400 includes identifying a first set of volumes of the plurality of volumes, where each volume of the first set of volumes has a lower-bound relative disparity greater than a first relative threshold. In an example, the data distribution module 224 may identify the first set of volumes as having a measure of spread that is unacceptable because their minimum IOPS settings may be significantly lower than the minimum IOPS settings of the other volumes of the plurality of volumes. For example, the first set of volumes has minimum IOPS setting disparities that are relatively large and have been identified as having a high likelihood of causing performance degradation. To mitigate the performance degradation, it may be desirable to increase the minimum IOPS settings of the first set of volumes to align their minimum IOPS settings with other volumes in the cluster.

For example, in FIG. 5, the table 500 includes a fifth column "Relative Threshold" 510 storing the first relative threshold of "0.1" for the plurality of volumes. If the lower-bound relative disparity of a volume satisfies the first relative threshold, then the data distribution module 224 may determine that the volume has a minimum IOPS setting disparity that is relatively large. In some examples, the lower-bound relative disparity of a volume satisfies the first relative threshold if the lower-bound relative disparity is less than the first relative threshold, or alternatively less than or equal to (not greater than) the first relative threshold.

The table 500 includes a sixth column "Volumes having LBRD<=Relative Threshold" 512 storing a first value (e.g., zero) if the volume identified in an entry does not have a lower-bound relative disparity less than or equal to (e.g., the lower-bound relative disparity is greater than) the first relative threshold (e.g., 0.1 in the illustrated example) and storing a second value (e.g., one) if the volume identified in the entry has a lower-bound relative disparity less than or equal to (e.g., the lower-bound relative disparity is not greater than) the first relative threshold. The first two entries in the table 500 indicate that each of volumes $208_1$ and $208_2$ has a lower-bound relative disparity not greater than the first relative threshold of 0.1, and accordingly it may be desirable to increase the minimum IOPS settings of these volumes because the distance between the minimum IOPS settings of these volumes and the lower bound of 50 is relatively large compared to the other volumes $208_3$-$208_{11}$. The remaining nine entries in the table 500 indicate that the volumes $208_3$-$208_{11}$ have a lower-bound relative disparity greater than the first relative threshold of 0.1, and accordingly it may be desirable to not increase the minimum IOPS setting of these volumes.

Referring back to FIG. 4, at block 410, the method 400 includes determining whether a percentage based on the first set of volumes (i.e., those volumes identified as having a measure of spread that is unacceptable because their minimum IOPS settings may be significantly lower than the minimum IOPS settings of the other volumes of the plurality of volumes) and the plurality of volumes is greater than a first performance threshold. In an example, the data distribution module 224 determines whether the percentage is greater than the first performance threshold. The first set of volumes may include a first number of volumes, and the plurality of volumes may include a second number of volumes (e.g., the second number being inclusive of the first number of volumes). The data distribution module 224 may calculate the percentage by dividing the first number by the second number, where the quotient is the percentage. In other words, the data distribution module 224 may determine a ratio of the first number of volumes to the second number of volumes and determine whether the ratio is greater than the first performance threshold, which may be predefined. The first performance threshold may indicate a "critical mass" at which the number of volumes having minimum IOPS setting disparities that are relatively large (e.g., the minimum IOPS settings of these volumes are significantly lower than the other volumes of the plurality of volumes) are likely to cause performance degradation in the future.

If the percentage is greater than the first performance threshold, the method 400 may proceed to block 412. At block 412, the method 400 includes transmitting a recommendation to the client to increase the minimum IOPS settings of the first set of volumes. If the percentage is greater than the first performance threshold, then the data distribution module 224 may determine that the likelihood of performance degradation is high if the minimum IOPS settings for the first set of volumes is not increased. For example, referring to FIG. 5, the data distribution module 224 may determine the percentage by dividing two (e.g., the number of volumes in the first set of volumes) by eleven (e.g., the number of volumes in the plurality of volumes), which provides a quotient of 0.1818. Accordingly, the percentage may be 0.1818 in this example. If the first performance threshold is, for example, 0.15 or 15 percent, then the data distribution module 224 may determine that the percentage is greater than the first performance threshold (e.g., 18.18>15). In this example, the data distribution module 224 may trigger the recommendation module 226 to transmit a recommendation to the client 214 to increase the minimum IOPS settings of the first set of volumes. The recommendation module 226 may provide a recommended minimum IOPS settings for the first set of volumes. In some aspects, the recommendation module 226 may modify the minimum IOPS setting of the first set of volumes to be P minimum IOPS setting, where P is a number greater than 0. In an example, P is the lower bound of the set of volumes. In another example, the recommendation module 226 determines a product of the relative threshold and the lower bound 302, where P is the product.

In contrast, if the percentage is not greater than the first performance threshold, the method 400 may proceed to block 414. At block 414, the method 400 ends. If the percentage is not greater than the first performance threshold, then the data distribution module 224 may determine that the likelihood of performance degradation is low, even if the minimum IOPS settings for the first set of volumes is not increased. In some examples, the data distribution module 224 and/or the recommendation module 226 may determine that such a small number of volumes (with respect to the plurality of volumes) having a lower-bound relative disparity less than or equal to the first relative threshold may be unlikely to cause performance degradation. For example, as discussed above with regard to FIG. 5, the percentage may be 0.1818. If the first performance threshold is, for example, 0.25 or 25 percent, the data distribution module 224 may determine that the percentage is not greater than the first performance threshold (e.g., 18.18<25). In this example, the data distribution module 224 does not trigger the recommendation module 226 to transmit a recommendation to the client 214 to increase the minimum IOPS settings of the first set of volumes. At a later point in time, the number of volumes in the first set of volumes may grow and trigger the data distribution module 224 to transmit the recommendation.

The QoS minimum module 220 may execute the method 400 based on various mechanisms. For example, the QoS minimum module 220 may execute the method 400 periodically (e.g., every week), based on a client request, based on detecting that the client has created X volumes, and/or based on detecting that the client has deleted Y volumes. Additionally, the QoS minimum module 220 may execute the method 400 for one or more clients.

FIG. 6 is a flow diagram of a method 600 of providing a minimum IOPS setting recommendation to decrease the minimum IOPS settings based on an upper bound according to one or more aspects of the present disclosure. Blocks of the method 600 can be executed by a computing device (e.g., a processor, processing circuit, and/or other suitable component, such as of a storage node 203). For example, the QoS minimum module 220 may utilize one or more components, such as the data collector 222, the data distribution module 224, and/or the recommendation module 226, to execute the blocks of method 600. As illustrated, the method 600 includes a number of enumerated blocks, but embodiments of the method 600 may include additional blocks before, after, and in between the enumerated blocks. In some embodiments, one or more of the enumerated blocks may be omitted or performed in a different order.

FIG. 6 will be discussed relative to FIG. 7 (and vice versa) to better understand concepts related to determining whether to provide a recommendation to a client to decrease the minimum IOPS settings of a set of volumes. FIG. 7 is a table 700 storing QoS information in relation to the upper bound according to one or more aspects of the present disclosure.

In FIG. 6, at block 402, the method 600 includes determining a plurality of minimum IOPS settings assigned to a plurality of volumes in a common cluster, each volume of the plurality of volumes being assigned a minimum IOPS setting of the plurality of minimum IOPS settings by a client. The block 402 in FIG. 6 may correspond to the block 402 in FIG. 4. Additionally, in FIG. 7, the table 700 includes the first column "Volume identifier" 502 and the second column "Min IOPS Settings" 504 as discussed above in relation to FIGS. 4 and 5.

At block 604, the method 600 includes determining an upper bound for the plurality of minimum IOPS settings, the upper bound indicating a second distribution of minimum IOPS settings assigned to the plurality of volumes. In an example, the data distribution module 224 may determine the upper bound for the plurality of minimum IOPS settings. The upper bound may provide a snapshot of a second distribution of minimum IOPS settings across the common cluster. The second distribution associated with the upper bound may be different from the first distribution associated with the lower bound (see block 404 in FIG. 4). In some examples, the second distribution may correspond to a higher distribution of data than the lower distribution. For example, the second distribution may correspond to a range of about the seventieth percentile and about the eightieth percentile of the distribution of minimum IOPS settings, and the first distribution may correspond to a range of about the twentieth percentile and about the thirty-third percentile of the distribution of minimum IOPS settings.

For example, in FIG. 7, the table 700 includes a third column "Upper Bound ($75^{th}$ percentile)" 706 storing the upper bound of 60 for the plurality of volumes. In particular, 60 minimum IOPS indicates a seventy-fifth percentile distribution of the plurality of minimum IOPS settings assigned to the plurality of volumes, where the upper 25 percent of the plurality of volumes (e.g., eleven volumes) falls at or above the upper bound of 60 minimum IOPS.

Referring back to FIG. 6, at block 606, the method 600 includes for each volume of the plurality of volumes, calculating an upper-bound relative disparity based on the upper bound and the minimum IOPS setting assigned to the respective volume. In an example, the data distribution module 224 may calculate an upper-bound relative disparity for each volume of the plurality of volumes. The upper-bound relative disparity may provide a measure of distance between the minimum IOPS setting assigned to a volume and the upper bound. In some examples, the upper-bound relative disparity may be a relative disparity percentage value. The data distribution module 224 may calculate a percentage difference based on the minimum IOPS setting of a volume and the upper bound.

For example, in FIG. 7, the table 700 includes a fourth column "Upper-Bound Relative Disparity (UBRD)" 708 storing the upper-bound relative disparity for each volume of the plurality of volumes. The data distribution module 224 may calculate the upper-bound relative disparity for a volume by dividing the minimum IOPS setting for the volume by the upper bound. For example, to determine the upper-bound relative disparity for the volumes $208_1$ and $208_2$, the data distribution module 224 may divide 4 by 60 to obtain 0.07; to determine the upper-bound relative disparity for the volume $208_3$, the data distribution module 224 may divide 50 by 60 to obtain 0.83; to determine the upper-bound relative disparity for the volumes $208_4$-$208_9$, the data distribution module 224 may divide 60 by 60 to obtain 1; to determine the upper-bound relative disparity for the volume $208_{10}$, the data distribution module 224 may divide 800 by 60 to obtain 13.13 and to determine the upper-bound relative disparity for the volume $208_{11}$, the data distribution module 224 may divide 850 by 60 to obtain 14.17.

The upper-bound relative disparity may provide a relative difference of minimum IOPS settings between any volume and the rest of the plurality of volumes. Smaller differences between the upper-bound relative disparities of volumes may indicate that the volumes have been assigned minimum IOPS settings that are relatively close to each other. For example, the volumes $208_3$-$208_9$ have an upper-bound relative disparity between 0.83 and 1, with a difference of 0.17 between them. Such a small difference may indicate that these volumes have been assigned minimum IOPS settings that are relatively close to each other. Larger differences between the upper-bound relative disparities of volumes may indicate that the volumes have been assigned minimum IOPS settings that are not relatively close (or are far from) to each other. For example, the volumes $208_1$ and $208_2$ have an upper-bound relative disparity of 0.07 and the volume $208_{10}$ has an upper-bound relative disparity of 13.33, with a difference of 13.06 between them. Such a large difference may indicate that these volumes have been assigned minimum IOPS settings that are not relatively close (or are far from) to each other.

Additionally, the further a volume's upper-bound relative disparity value is from 1 may indicate how far the volume's minimum IOPS setting is from the upper bound relative to other volumes of the plurality of volumes. For example, the volume $208_3$ has an upper-bound relative disparity of 0.83, and the volume $208_{10}$ has an upper-bound relative disparity of 13.33. The upper-bound relative disparity of the volume $208_3$ is closer to 1 than the upper-bound relative disparity of the volume $208_{10}$. Accordingly, the minimum IOPS settings of the volume $208_3$ is closer to the upper bound than the volume $208_{10}$.

Referring back to FIG. 6, at block 608, the method 600 includes identifying a second set of volumes of the plurality of volumes, where each volume of the second set of volumes has an upper-bound relative disparity greater than a second relative threshold. The second relative threshold may be greater than the first relative threshold (see block 408 in FIG. 4) because the second relative threshold is compared against an upper-bound relative disparity associated with greater minimum IOPS settings than the first relative threshold. In an example, the data distribution module 224 may identify the second set of volumes as having a measure of spread that is unacceptable because their minimum IOPS settings may be significantly higher than the minimum IOPS settings of the other volumes of the plurality of volumes. For example, the second set of volumes has minimum IOPS setting disparities that are relatively large and have been identified as having a high likelihood of causing performance degradation. To mitigate the performance degradation, it may be desirable to decrease the minimum IOPS settings of the second set of volumes to align their minimum IOPS settings with other volumes in the cluster.

For example, in FIG. 7, the table 700 includes a fifth column "Relative Threshold" 710 storing the second relative threshold of "10" for the plurality of volumes. If the upper-bound relative disparity of a volume satisfies the second relative threshold, then the data distribution module 224 may determine that the volume has a minimum IOPS setting disparity that is relatively large. In some examples, the upper-bound relative disparity of a volume satisfies the second relative threshold if the upper-bound relative disparity is greater than the second relative threshold, or alternatively is greater than or equal to (not less than) the second relative threshold.

The table 700 also includes a sixth column "Volumes having UBRD>=Relative Threshold" 712 storing a first value (e.g., zero) if the volume identified in an entry does not have an upper-bound relative disparity greater than or equal to (e.g., the upper-bound relative disparity is less than) the second relative threshold (e.g., 10) and storing a second value (e.g., one) if the volume identified in the entry has an upper-bound relative disparity greater than or equal to (e.g., the upper-bound relative disparity is not less than) the second relative threshold. The first nine entries in the table 700 indicate that each of volumes $208_1$-$208_9$ has an upper-bound relative disparity less than the second relative threshold of 10, and accordingly it may be desirable to not decrease the minimum IOPS setting of these volumes. The remaining two entries in the table 700 indicate that the volumes $208_{10}$ and $208_{11}$ have an upper-bound relative disparity not less than the second relative threshold of 10, and accordingly it may be desirable to decrease the minimum IOPS setting of these volumes because the distance between the minimum IOPS settings of these volumes and the upper bound of 60 is relatively large compared to the other volumes $208_1$-$208_9$.

Referring back to FIG. 6, at block 610, the method 600 includes determining whether a percentage based on the second set of volumes (i.e., those volumes identified as having a measure of spread that is unacceptable because their minimum IOPS settings may be significantly higher than the minimum IOPS settings of the other volumes of the plurality of volumes) and the plurality of volumes is greater than a second performance threshold. In an example, the data distribution module 224 determines whether the percentage is greater than the second performance threshold. The second performance threshold may be different from or the same as the first performance threshold in block 410 in FIG. 4. The second set of volumes may include a first number of volumes, and the plurality of volumes may include a second number of volumes (e.g., the second number being inclusive of the first number of volumes). The data distribution module 224 may calculate the percentage by dividing the first number by the second number, where the quotient is the percentage. In other words, the data distribution module 224 may determine a ratio of the first number of volumes to the second number of volumes and determine whether the ratio is greater than the second performance threshold, which may be predefined. The second performance threshold may indicate a "critical mass" at which the number of volumes having minimum IOPS setting disparities that are relatively large (e.g., the minimum IOPS settings of these volumes are significantly greater than the other volumes of the plurality of volumes) are likely to cause performance degradation in the future.

If the percentage is greater than the second performance threshold, the method 600 may proceed to block 612. At block 612, the method 600 includes transmitting a recommendation to the client to decrease the minimum IOPS settings of the second set of volumes. If the percentage is greater than the second performance threshold, then the data distribution module 224 may determine that the likelihood of performance degradation is high if the minimum IOPS settings for the second set of volumes is not decreased. For example, referring to FIG. 7, the data distribution module 224 may determine the percentage by dividing two (e.g., the number of volumes in the second set of volumes) by eleven (e.g., the number of volumes in the plurality of volumes), which provides a quotient of 0.1818. Accordingly, the percentage may be 0.1818 in this example. If the second performance threshold is, for example, 0.15 or 15 percent, the data distribution module 224 may determine that the percentage is greater than the second performance threshold (e.g., 18.18>15). In this example, the data distribution module 224 may trigger the recommendation module 226 to transmit a recommendation to the client 214 to decrease the minimum IOPS settings of the second set of volumes. The recommendation module 226 may provide a recommended minimum IOPS settings for the second set of volumes. In some aspects, the recommendation module 226 may modify the minimum IOPS setting of the second set of volumes to be Q minimum IOPS setting, where Q is a number greater than 0. In an example, Q is the upper bound of the set of volumes. In another example, the recommendation module 226 determines a product of the relative threshold and the upper bound 304, where Q is the product.

In contrast, if the percentage is not greater than the second performance threshold, the method 600 may proceed to block 614. At block 614, the method 600 ends. If the percentage is not greater than the second performance threshold, then the data distribution module 224 may determine that the likelihood of performance degradation is low, even if the minimum IOPS settings for the second set of volumes is not decreased. In some examples, the data distribution module 224 and/or the recommendation module 226 may determine that such a small number of volumes (with respect to the plurality of volumes) having an upper-bound relative disparity greater than or equal to the second relative threshold may be unlikely to cause performance degradation. For example, as discussed above with regard to FIG. 7, the percentage may be 0.1818. If the second performance threshold is, for example, 0.25 or 25 percent, the data distribution module 224 may determine that the percentage is not greater than the second performance threshold (e.g., 18.18<25). In this example, the data distribution module 224 does not trigger the recommendation module 226 to transmit a recommendation to the client 214 to decrease the minimum IOPS settings of the second set of volumes. At a later point in time, the number of volumes in the second set of volumes may grow and trigger the data distribution module 224 to transmit the recommendation.

The QoS minimum module 220 may execute the method 600 based on various mechanisms. For example, the QoS minimum module 220 may execute the method 600 periodically (e.g., every week), based on a client request, based on detecting that the client has created X volumes, and/or based on detecting that the client has deleted Y volumes. Further, the QoS minimum module 220 may execute the method 600 for one or more clients.

Additionally, the QoS minimum module 220 may execute any blocks of the method 400 before or after executing any blocks of the method 600. In some examples, the QoS minimum module 220 may execute the method 400 and then execute the method 600 after initiating or completing the execution of the method 400. In some examples, the QoS minimum module 220 may execute the method 600 and then execute the method 400 after initiating or completing the execution of the method 600.

Figure 8:
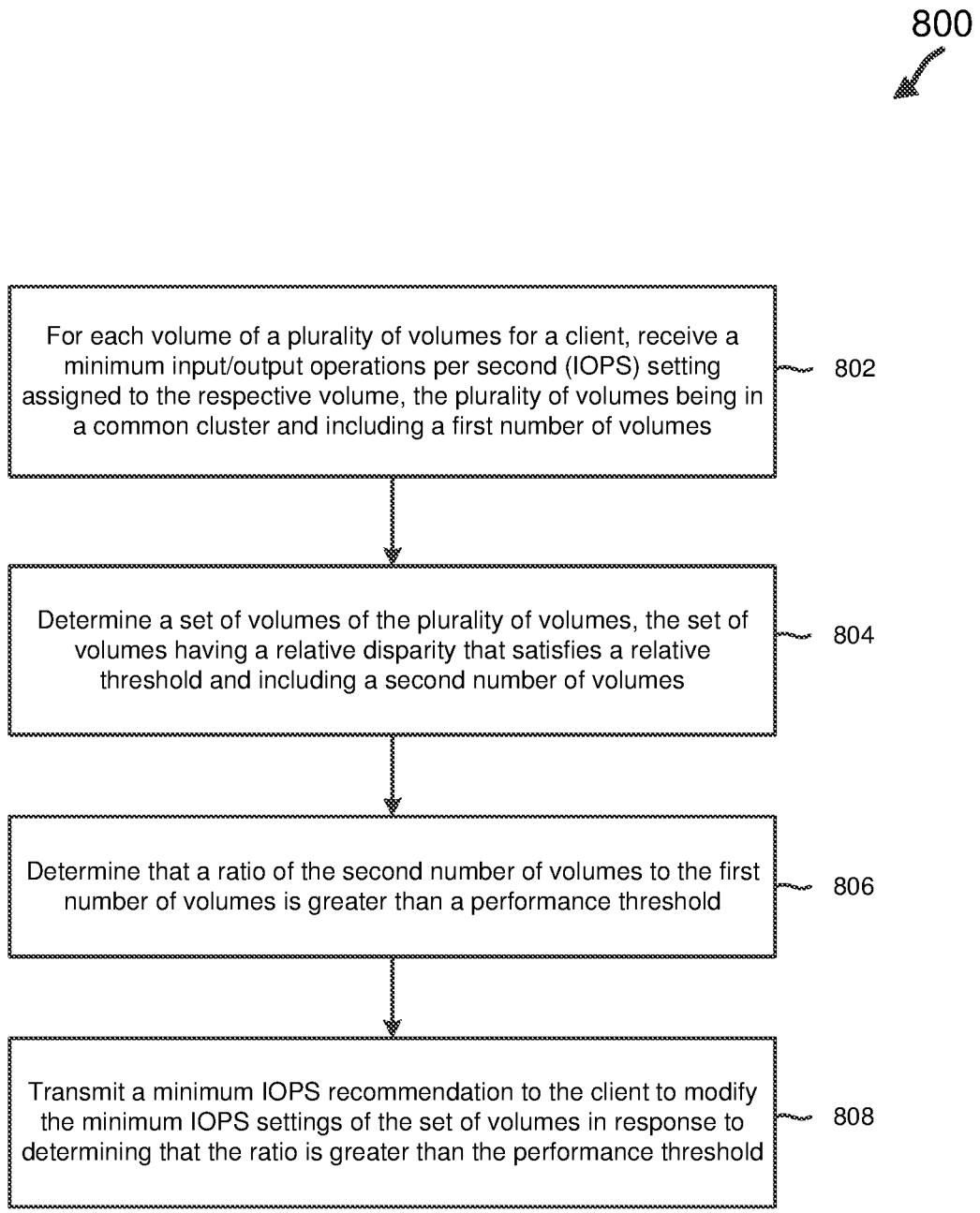
FIG. 8 illustrates a flow diagram of a method of providing a minimum IOPS setting recommendation to modify the minimum IOPS settings according to one or more aspects of the present disclosure.

FIG. 8 is a flow diagram of a method 800 of providing a minimum IOPS setting recommendation to modify the minimum IOPS settings according to one or more aspects of the present disclosure. Blocks of the method 800 can be executed by a computing device (e.g., a processor, processing circuit, and/or other suitable component, such as of a storage node 203). For example, the QoS minimum module 220 may utilize one or more components, such as the data collector 222, the data distribution module 224, and/or the recommendation module 226, to execute the blocks of method 800. As illustrated, the method 800 includes a number of enumerated blocks, but embodiments of the method 800 may include additional blocks before, after, and in between the enumerated blocks. In some embodiments, one or more of the enumerated blocks may be omitted or performed in a different order.

At block 802, the method 800 includes for each volume of a plurality of volumes for a client, receiving a minimum IOPS setting assigned to the respective volume. The plurality of volumes may be in a common cluster and include a first number of volumes. A client may create a volume and set the minimum IOPS setting of the volume. The client may modify the minimum IOPS setting at a later point in time.

At block 804, the method 800 includes determining a set of volumes of the plurality of volumes, the set of volumes having a relative disparity that satisfies a relative threshold and including a second number of volumes.

In some examples, the relative disparity may correspond to a lower-bound relative disparity in block 406 and the relative threshold may correspond to the first relative threshold in block 408 in FIG. 4. For each volume of the plurality of volumes for the client, the QoS minimum module (e.g., the data distribution module 224) may calculate the lower-bound relative disparity for a volume by dividing the minimum IOPS setting assigned to the volume by a lower bound that indicates a percentile distribution of minimum IOPS settings assigned to the plurality of volumes. The lower bound may be defined as being between a range of about the twentieth percentile and about the thirty-third percentile of the minimum IOPS settings data (though other values are possible). In this example, the set of volumes may satisfy the first relative threshold if the lower-bound relative disparity of each volume of the set of volumes is not greater than the first relative threshold.

In some examples, the relative disparity may correspond to an upper-bound relative disparity in block 606 and the relative threshold may correspond to the second relative threshold in block 608 in FIG. 6. For each volume of the plurality of volumes for the client, the QoS minimum module (e.g., the data distribution module 224) may calculate the upper-bound relative disparity for a volume by dividing the minimum IOPS setting assigned to the volume by an upper bound that indicates a percentile distribution of minimum IOPS settings assigned to the plurality of volumes. The upper bound may be defined as being between a range of about the seventieth percentile and about the eightieth percentile of the minimum IOPS settings data (though other values are possible). In this example, the set of volumes may satisfy the second relative threshold if the upper-bound relative disparity of each volume of the set of volumes is not less than the second relative threshold. The first distribution corresponds to a lower distribution of data (e.g., minimum IOPS settings) than the second distribution. Similarly, the second distribution corresponds to a higher distribution of data (e.g., minimum IOPS settings) than the first distribution.

At block 806, the method 800 includes determining that a ratio of the second number of volumes to the first number of volumes is greater than a performance threshold. In some examples, the ratio may correspond to the percentage and the performance threshold may correspond to the first performance threshold in block 410 in FIG. 4. The first performance threshold may indicate a "critical mass" at which the number of volumes having minimum IOPS setting disparities that are relatively large (e.g., the minimum IOPS settings of these volumes are significantly lower than the other volumes of the plurality of volumes) are likely to cause performance degradation in the future. Accordingly, if the ratio is high enough, the data distribution module 224 may trigger the recommendation module 226 to send a recommendation to the client to modify (e.g., increase) the minimum IOPS settings of the set of volumes.

In some examples, the ratio may correspond to the percentage and the performance threshold may correspond to the second performance threshold in block 610 in FIG. 6. The second performance threshold may indicate a "critical mass" at which the number of volumes having minimum IOPS setting disparities that are relatively large (e.g., the minimum IOPS settings of these volumes are significantly greater than the other volumes of the plurality of volumes) are likely to cause performance degradation in the future. Accordingly, if the ratio is high enough, the data distribution module 224 may trigger the recommendation module 226 to send a recommendation to the client to modify (e.g., decrease) the minimum IOPS settings of the set of volumes At block 808, the method 800 includes transmitting a minimum IOPS recommendation to the client to modify the minimum IOPS settings of the set of volumes in response to determining that the ratio is greater than the performance threshold.

If the relative disparity corresponds to a lower-bound relative disparity, then the relative disparity of a volume is based on the lower bound and the minimum IOPS setting of the volume. In this example, the minimum IOPS settings of the set of volumes may be significantly higher than the other volumes. Accordingly, it may be desirable for the client to increase the minimum IOPS setting of the set of volumes if the ratio is greater than the first performance threshold. The recommendation module 226 may transmit the minimum IOPS recommendation to the client to increase the minimum IOPS settings of the set of volumes in response to determining that the relative disparity is based on a lower bound indicating a percentile distribution of minimum IOPS settings (e.g., minimum IOPS values) assigned to the plurality of volumes.

If the relative disparity corresponds to an upper-bound relative disparity, then the relative disparity of a volume is based on the upper bound and the minimum IOPS setting of the volume. In this example, the minimum IOPS settings of the set of volumes may be significantly higher than the other volumes. Accordingly, it may be desirable for the client to decrease the minimum IOPS setting of the set of volumes if the ratio is greater than the second performance threshold. The recommendation module 226 may transmit the minimum IOPS recommendation to the client to decrease the minimum IOPS settings of the set of volumes in response to determining that the relative disparity is based on an upper bound indicating a percentile distribution of minimum IOPS settings assigned to the plurality of volumes.

The recommendation module 226 may provide a recommended minimum IOPS settings for the set of volumes. If the relative disparity corresponds to a lower-bound relative disparity, the recommendation module 226 may modify the minimum IOPS setting of the set of volumes to be P minimum IOPS setting, where P is a number greater than 0. In an example, P is the lower bound of the set of volumes. In another example, the recommendation module 226 determines a product of the lower bound and the relative threshold associated with the lower bound, where P is the product. If the relative disparity corresponds to an upper-bound relative disparity, the recommendation module 226 may modify the minimum IOPS setting of the set of volumes to be Q minimum IOPS setting, where Q is a number greater than 0. In an example, Q is the upper bound of the set of volumes. In another example, the recommendation module 226 determines a product of the upper bound and the relative threshold associated with the upper bound, where Q is the product.

The present embodiments can take the form of an entirely hardware embodiment, an entirely software embodiment, or an embodiment containing both hardware and software elements. Accordingly, it is understood that any operation of the computing systems of computing architecture 100, 200 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Thus, the present disclosure provides a system, method, and machine-readable storage medium for providing a recommendation to the client to modify the minimum IOPS settings of a set of volumes in a distributed storage system. In some embodiments, the method includes for each volume of a plurality of volumes for a client, receiving a minimum IOPS setting assigned to the respective volume, the plurality of volumes being in a common cluster and including a first number of volumes. The method may also include determining a set of volumes of the plurality of volumes, the set of volumes having a relative disparity that satisfies a relative threshold and including a second number of volumes. The method may further include determining that a ratio of the second number of volumes to the first number of volumes is greater than a performance threshold. The method may also include transmitting a minimum IOPS recommendation to the client to modify the minimum IOPS settings of the set of volumes in response to determining that the ratio is greater than the performance threshold.

In yet further embodiments, the non-transitory machine-readable medium has instructions for performing a method of transmitting a recommendation of a client to modify minimum IOPS settings of a set of volumes, including machine executable code which when executed by at least one machine, causes the machine to: for each volume of a plurality of volumes for a client: receive a minimum IOPS setting assigned to the respective volume, the plurality of volumes being in a common cluster; and calculate a lower-bound relative disparity based on a lower bound and the minimum IOPS setting assigned to the respective volume, the lower bound indicating a distribution of minimum IOPS settings assigned to the plurality of volumes; determine whether a percentage based on a set of volumes and the plurality of volumes is greater than a performance threshold, each volume of the set of volumes having the lower-bound relative disparity less than a lower-bound relative threshold; and transmit a minimum IOPS recommendation to the client to increase the minimum IOPS settings of the set of volumes in response to determining that the percentage is greater than the performance threshold.

In some examples, the non-transitory machine-readable medium, further includes code, which causes the machine to for each volume of the plurality of volumes for the client, divide the minimum IOPS setting assigned to the respective volume by the lower bound to determine the lower-bound relative disparity for the respective volume. In some examples, the non-transitory machine-readable medium, further includes code, which causes the machine to calculate the lower-bound relative disparity by dividing the minimum IOPS setting assigned to the respective volume by the lower bound. In some examples, the non-transitory machine-readable medium, further includes code, which causes the machine to transmit a second minimum IOPS recommendation to the client to decrease the minimum IOPS settings of a second set of volumes in response to determining that a second percentage based on the second set of volumes having an upper-bound relative disparity greater than an upper-bound relative threshold is greater than a second performance threshold. In some examples, the non-transitory machine-readable medium, further includes code, which causes the machine to transmit a volume identifier of each volume of the set of volumes to the client. In some examples, the distribution is between a range of a twentieth and a twenty-fifth percentile distribution of the minimum IOPS settings assigned to the plurality of volumes.

In yet further embodiments, a computing device includes a memory containing a machine-readable medium comprising machine executable code having stored thereon instructions for performing a method of transmitting a recommendation of a client to modify minimum IOPS settings of a set of volumes; and a processor coupled to the memory. The processor is configured to execute the machine executable code to: for each volume of a plurality of volumes for a client: receive a minimum IOPS setting assigned to the respective volume, the plurality of volumes being in a common cluster; and calculate an upper-bound relative disparity based on an upper bound and the minimum IOPS setting assigned to the respective volume, the upper bound indicating a distribution of minimum IOPS settings assigned to the plurality of volumes; determine whether a percentage based on the set of volumes and the plurality of volumes is greater than a performance threshold, each volume of the set of volumes having the upper-bound relative disparity greater than an upper-bound relative threshold; and transmit a minimum IOPS recommendation to the client to decrease the minimum IOPS settings of the set of volumes in response to determining that the percentage is greater than the performance threshold.

In some examples, the processor is further configured to execute the machine executable code to for each volume of the plurality of volumes for the client, divide the minimum IOPS setting assigned to the respective volume by the upper bound to determine the upper-bound relative disparity for the respective volume. In some examples, the processor is further configured to execute the machine executable code to calculate the upper-bound relative disparity by dividing the minimum IOPS setting assigned to the respective volume by the upper bound. In some examples, the processor is further configured to execute the machine executable code to transmit a second minimum IOPS recommendation to the client to increase the minimum IOPS settings of a second set of volumes in response to determining that a second percentage based on the second set of volumes having a lower-bound relative disparity less than a lower-bound relative threshold is greater than a second performance threshold. In some examples, the processor is further configured to execute the machine executable code to transmit a volume identifier of each volume of the set of volumes to the client. In some examples, the distribution is between a range of a seventieth and an eightieth percentile of the minimum IOPS settings assigned to the plurality of volumes.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
for each volume of a plurality of volumes for a client, receiving a minimum input/output operations per second (IOPS) setting assigned to the respective volume, the plurality of volumes being in a common cluster and including a first number of volumes;
determining a set of volumes of the plurality of volumes, the set of volumes having a relative disparity that satisfies a relative threshold and including a second number of volumes;
determining that a ratio of the second number of volumes to the first number of volumes is greater than a performance threshold; and
transmitting a minimum IOPS recommendation to the client to modify the minimum IOPS settings of the set of volumes in response to determining that the ratio is greater than the performance threshold.

2. The method of claim 1, comprising:
for each volume of the plurality of volumes for the client, calculating the relative disparity for the respective volume by dividing the minimum IOPS setting assigned to the respective volume by a lower bound that indicates a percentile distribution of minimum IOPS settings assigned to the plurality of volumes.

3. The method of claim 1, wherein the set of volumes satisfies the relative threshold if the relative disparity of each volume of the set of volumes is not greater than the relative threshold.

4. The method of claim 1, wherein the transmitting a minimum IOPS recommendation includes transmitting the minimum IOPS recommendation to the client to increase the minimum IOPS settings of the set of volumes in response to determining that the relative disparity is based on a lower bound indicating a percentile distribution of minimum IOPS settings assigned to the plurality of volumes.

5. The method of claim 1, wherein the transmitting a minimum IOPS recommendation includes transmitting a volume identifier of each volume of the set of volumes to the client.

6. The method of claim 1, comprising:
for each volume of the plurality of volumes for the client, calculating the relative disparity for the respective volume by dividing the minimum IOPS setting assigned to the respective volume by an upper bound that indicates a percentile distribution of minimum IOPS settings assigned to the plurality of volumes.

7. The method of claim 1, wherein the set of volumes satisfies the relative threshold if the relative disparity of each volume of the set of volumes is not less than the relative threshold.

8. The method of claim 1, wherein the transmitting a minimum IOPS recommendation includes transmitting the minimum IOPS recommendation to the client to decrease the minimum IOPS settings of the set of volumes in response to determining that the relative disparity is based on an upper bound indicating a percentile distribution of minimum IOPS settings assigned to the plurality of volumes.

9. A non-transitory machine-readable medium having stored thereon instructions for performing a method of performing a method of transmitting a recommendation of a client to modify minimum IOPS settings of a set of volumes, comprising machine executable code which when executed by at least one machine, causes the machine to:
for each volume of a plurality of volumes for a client:
receive a minimum input/output operations per second (IOPS) setting assigned to the respective volume, the plurality of volumes being in a common cluster; and
calculate a lower-bound relative disparity based on a lower bound and the minimum IOPS setting assigned to the respective volume, the lower bound indicating a distribution of minimum IOPS settings assigned to the plurality of volumes;
determine whether a percentage based on a set of volumes and the plurality of volumes is greater than a performance threshold, each volume of the set of volumes having the lower-bound relative disparity less than a lower-bound relative threshold; and
transmit a minimum IOPS recommendation to the client to increase the minimum IOPS settings of the set of volumes in response to determining that the percentage is greater than the performance threshold.

10. The non-transitory machine-readable medium of claim 9, further comprising code, which causes the machine to:
for each volume of the plurality of volumes for the client, divide the minimum IOPS setting assigned to the respective volume by the lower bound to determine the lower-bound relative disparity for the respective volume.

11. The non-transitory machine-readable medium of claim 9, wherein the distribution is between a range of a twentieth and a twenty-fifth percentile distribution of the minimum IOPS settings assigned to the plurality of volumes.

12. The non-transitory machine-readable medium of claim 9, further comprising code, which causes the machine to:
calculate the lower-bound relative disparity by dividing the minimum IOPS setting assigned to the respective volume by the lower bound.

13. The non-transitory machine-readable medium of claim 9, further comprising code, which causes the machine to:
transmit a second minimum IOPS recommendation to the client to decrease the minimum IOPS settings of a second set of volumes in response to determining that a second percentage based on the second set of volumes having an upper-bound relative disparity greater than an upper-bound relative threshold is greater than a second performance threshold.

14. The non-transitory machine-readable medium of claim 9, further comprising code, which causes the machine to:
transmit a volume identifier of each volume of the set of volumes to the client.

15. A computing device comprising:
a memory containing a machine-readable medium comprising machine executable code having stored thereon instructions for performing a method of transmitting a recommendation of a client to modify minimum IOPS settings of a set of volumes; and a processor coupled to the memory, the processor configured to execute the machine executable code to:

for each volume of a plurality of volumes for a client:

receive a minimum input/output operations per second (IOPS) setting assigned to the respective volume, the plurality of volumes being in a common cluster; and calculate an upper-bound relative disparity based on an upper bound and the minimum IOPS setting assigned to the respective volume, the upper bound indicating a distribution of minimum IOPS settings assigned to the plurality of volumes;

determine whether a percentage based on the set of volumes and the plurality of volumes is greater than a performance threshold, each volume of the set of volumes having the upper-bound relative disparity greater than an upper-bound relative threshold; and transmit a minimum IOPS recommendation to the client to decrease the minimum IOPS settings of the set of volumes in response to determining that the percentage is greater than the performance threshold.

16. The computing device of claim 15, wherein the processor is configured to execute the machine executable code to:

for each volume of the plurality of volumes for the client, divide the minimum IOPS setting assigned to the respective volume by the upper bound to determine the upper-bound relative disparity for the respective volume.

17. The computing device of claim 15, wherein the distribution is between a range of a seventieth and an eightieth percentile of the minimum IOPS settings assigned to the plurality of volumes.

18. The computing device of claim 15, wherein the processor is configured to execute the machine executable code to:

calculate the upper-bound relative disparity by dividing the minimum IOPS setting assigned to the respective volume by the upper bound.

19. The computing device of claim 15, wherein the processor is configured to execute the machine executable code to:

transmit a second minimum IOPS recommendation to the client to increase the minimum IOPS settings of a second set of volumes in response to determining that a second percentage based on the second set of volumes having a lower-bound relative disparity less than a lower-bound relative threshold is greater than a second performance threshold.

20. The computing device of claim 15, wherein the processor is configured to execute the machine executable code to:

transmit a volume identifier of each volume of the set of volumes to the client.

* * * * *